United States Patent
Katsumata

(10) Patent No.: US 7,382,973 B2
(45) Date of Patent: Jun. 3, 2008

(54) DATA PROCESSING APPARATUS, INFORMATION PROCESSING SYSTEM AND COMPUTER-READABLE RECORDING MEDIUM RECORDING SELECTING PROGRAM

(75) Inventor: Hajime Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 11/062,611

(22) Filed: Feb. 22, 2005

(65) Prior Publication Data

US 2006/0101339 A1 May 11, 2006

(30) Foreign Application Priority Data

Nov. 8, 2004 (JP) ............................. 2004-323668

(51) Int. Cl.
- H04N 7/26 (2006.01)
- H04N 5/91 (2006.01)
- G11B 5/02 (2006.01)
- G11B 27/02 (2006.01)
- G06F 3/00 (2006.01)
- G06K 9/03 (2006.01)
- G03B 17/24 (2006.01)

(52) U.S. Cl. ................ 386/124; 386/66; 386/102; 386/104; 360/1; 360/13; 360/18; 715/723; 382/168; 382/311; 396/312

(58) Field of Classification Search ............ 715/500.1, 715/723–727, 730–732; 345/473; 725/37; 386/66, 95, 96, 102–106, 124; 396/310–312; 700/17, 83; 382/168, 170–172, 309, 311; 360/1, 13, 18, 32

See application file for complete search history.

(56) References Cited

U.S. PATENT DOCUMENTS 5,436,682 A * 7/1995 Katoh et al. ................ 353/15
5,742,857 A * 4/1998 Nanba et al. ............... 396/319

(Continued)

FOREIGN PATENT DOCUMENTS

CN 1503159 6/2004

(Continued)

OTHER PUBLICATIONS

Korean Office Action, dated Aug. 24, 2006, and issued in related Korean Application No. 10-2005-0025835.

(Continued)

Primary Examiner—Crystal J. Barnes
(74) Attorney, Agent, or Firm—Staas & Halsey LLP

(57) ABSTRACT

The present invention provides a data processing apparatus comprising a first additional information acquisition unit for acquiring the first additional information with regard to a first processing target data; a second additional information acquisition unit acquiring the second additional information with regard to a second processing target data that is processed in relation to the first processing target data; and a selecting unit selecting at least one second processing target data from among the plural second processing target data on the basis of the first additional information, the second additional information, and a selection condition that has been set in advance. The data processing apparatus can easily select at least one processing target data from among a plurality of processing target data and is excellent in the aspect of a pastime.

23 Claims, 4 Drawing Sheets

U.S. PATENT DOCUMENTS

| | | | |
|---|---|---|---|
| 5,818,435 A * | 10/1998 | Kozuka et al. | 715/500.1 |
| 6,084,169 A * | 7/2000 | Hasegawa et al. | 84/600 |
| 6,100,919 A * | 8/2000 | Inoue et al. | 348/46 |
| 6,211,974 B1 | 4/2001 | Haneda | 358/527 |
| 6,243,171 B1 | 6/2001 | Haneda | 358/1.15 |
| 6,459,511 B1 | 10/2002 | Haneda | 358/506 |
| 6,483,602 B1 | 11/2002 | Haneda | 358/1.16 |
| 6,938,209 B2 * | 8/2005 | Ogawa et al. | 715/727 |
| 7,019,205 B1 * | 3/2006 | Fujisawa et al. | 84/609 |
| 7,116,328 B2 * | 10/2006 | Kawai et al. | 345/473 |
| 7,246,112 B2 * | 7/2007 | Ishida et al. | 707/3 |
| 7,266,202 B1 * | 9/2007 | Kawakami et al. | 380/283 |
| 2001/0037721 A1 | 11/2001 | Hasegawa et al. | 84/609 |
| 2002/0033889 A1 | 3/2002 | Miyazaki | 348/232 |
| 2004/0100487 A1 * | 5/2004 | Mori et al. | 345/724 |
| 2004/0218894 A1 | 11/2004 | Harville et al. | 386/46 |
| 2005/0084246 A1 * | 4/2005 | Yamagaka et al. | 386/95 |
| 2006/0133795 A1 * | 6/2006 | Terai | 396/287 |
| 2006/0204140 A1 * | 9/2006 | Ueda et al. | 382/305 |
| 2006/0245804 A1 * | 11/2006 | Yamamoto | 400/62 |
| 2006/0245805 A1 * | 11/2006 | Takakuwa et al. | 400/62 |

FOREIGN PATENT DOCUMENTS

| | | |
|---|---|---|
| EP | 1 422 668 A2 | 5/2004 |
| EP | 1 469 456 A1 | 10/2004 |
| JP | 08069292 A * | 3/1996 |
| JP | 8-101907 | 4/1996 |
| JP | 9-22416 | 1/1997 |
| JP | 2000-325662 | 11/2000 |
| JP | 2003178273 A * | 6/2003 |
| JP | 2003309815 A * | 10/2003 |
| JP | 2006074548 A * | 3/2006 |
| KR | 2001-0095701 | 11/2001 |
| KR | 2002-0088941 | 11/2002 |

OTHER PUBLICATIONS

Chinese Office issued in corresponding Chinese Patent Application No. 200510058901.7 on May 25, 2007.
European Search Report dated Feb. 16, 2006 for corresponding European Patent Application No. 05251413.0.

* cited by examiner

FIG. 2(A)
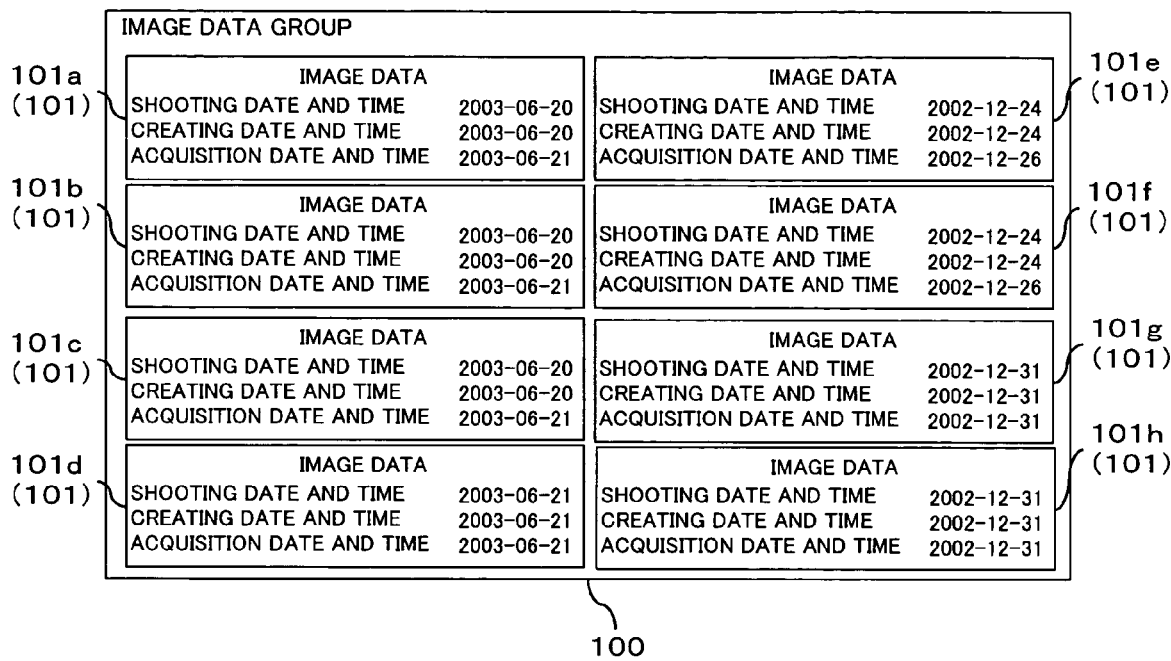
FIG. 2(B)
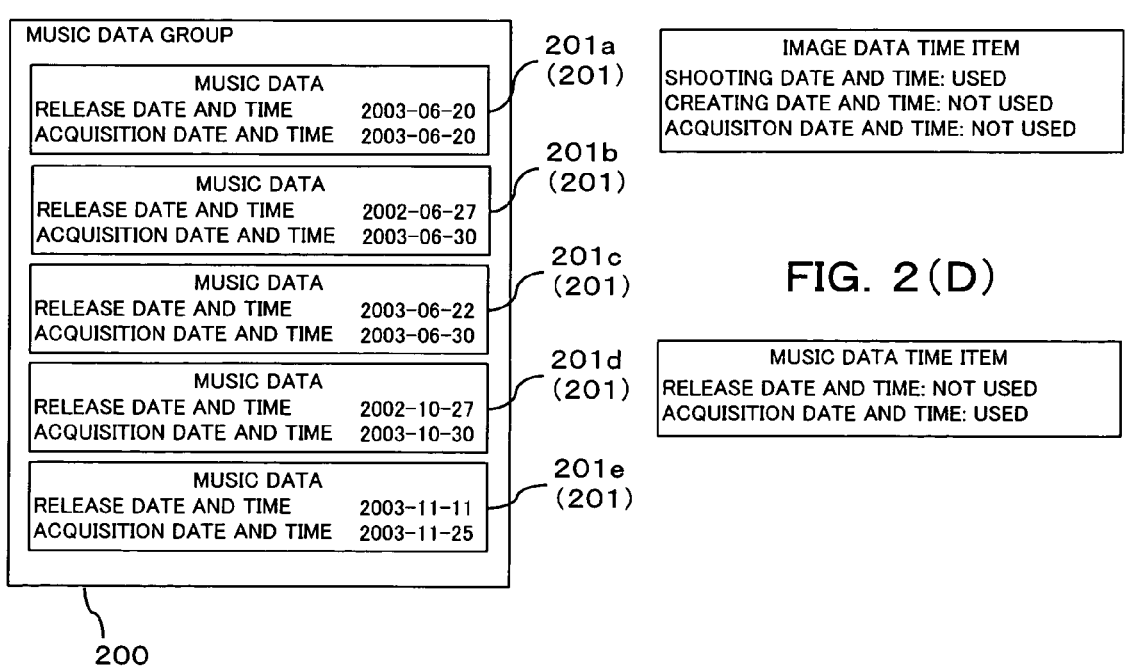
FIG. 2(C)
| IMAGE DATA TIME ITEM |
|---|
| SHOOTING DATE AND TIME: USED |
| CREATING DATE AND TIME: NOT USED |
| ACQUISITON DATE AND TIME: NOT USED |
FIG. 2(D)
| MUSIC DATA TIME ITEM |
|---|
| RELEASE DATE AND TIME: NOT USED |
| ACQUISITION DATE AND TIME: USED |

SETTING OF MUSIC SELECTING RULE
SET RULE FOR COMBINING IMAGE WITH MUSIC

SET PRIORITY OF DATE INFORMATION TO BE USED

○ IMAGE                           ○ MUSIC

| 1:SHOOTING DATE AND TIME | 1:RECORDING DATE AND TIME |
| 2:CREATING DATE AND TIME | 2:PURCHASE DATE AND TIME |
| 3:ACQUISITION DATE AND TIME | 3:RELEASE DATE AND TIME |
| 4:FILING DATE AND TIME | 4:FILING DATE AND TIME |

SET PRIORITY AND SELECTION RANGE OF MUSIC SELECTION CONDITION

○ MUSIC SELECTION CONDITION    ○ RANGE

1:COMBINATION IN SAME MONTH
2:COMBINATION IN SAME SEASON
3:COMBINATION IN CLOSE DATE AND TIME

☐ SELECT MOST SUITABLE ONE FOR MUSIC SELECTION CONDITION

☑ SELECT IN WIDE RANGE OF MUSIC SELECTION CONDITION

SEASON:SPRING (MARCH TO MAY),SUMMER (JUNE TO AUGUST),
AUTUMN(SEPTEMBER TO NOVEMBER),WINTER (DECEMBER TO FEBRUARY)

↑ ↓ ←→ :SHIFT  DECISION:SELECT
         MENU:DECIDE MUSIC SELECTION RULE
         CANCEL:CANCEL

311

DATA PROCESSING APPARATUS, INFORMATION PROCESSING SYSTEM AND COMPUTER-READABLE RECORDING MEDIUM RECORDING SELECTING PROGRAM

BACKGROUND OF THE INVENTION (1) Field of the Invention

The present invention relates to an art that is preferable to select specific data from among a plurality of data, and for example, an art for selecting music data to be reproduced in additon to display of a still image and a moving image.

(2) Description of the Related Art

In recent years, in image display software and presentation software, there is known a function called "slide show" which reproduces a plurality of still images and moving images while sequentially changing over them. Hereinafter, the still image and the moving image may be simply referred to as image data.

Further, according to this slide show, reproduction of music (music data) may be possible as a BGM (Background Music) in addition to display of the image.

In the meantime, as a conventional method of selecting the music data to be reproduced on such a slide show, for example, the following (1) to (3) methods are known.
(1) A user manually selects the music data to be reproduced as the BGM from among a plurality of music data saved in a PC (Personal Computer) in advance and reproduces it, and then, the user starts a slide show during reproduction of the music data.
(2) Relating the image data with the music data in advance, the user reproduces this related music data upon reproduction of the image data (refer to Japanese Patent Application Laid-open Nos. HEI9-22416 and 8-101907).
(3) The user manually selects the music data as the BGM and reproduces it during execution of the slide show.

However, according to the above-described conventional method of selecting the music data, for example, according to the methods (1) and (3), the user is required to perform the selection operation with respect to the music data to be reproduced, so that these methods are complicated. Particularly, when there are many music data, it is complicated to select the specific music data from among these many music data. As a result, the user often selects the same music data every time, which leads to a lack of pleasure for a pastime.

In addition, according to the above-described method (2), there is a problem that many operations are required to relate the image data with the music data and the operations are complicated. Further, for example, when new music data is added, in order to reproduce this new music data together with the image data, the operation for relating them should be separately carried out, so that this method is not convenient.

SUMMARY OF THE INVENTION

The present invention has been made taking the foregoing problems into consideration and an object of which is to easily select at least one processing target data from among a plurality of processing target data and to enhance the pleasure for a pastime.

Therefore, a data processing apparatus according to the present invention may comprise a first additional information acquisition unit acquiring first additional information with regard to first processing target data, a second additional information acquisition unit acquiring second additional information with regard to second processing target data that is processed in relation to the first processing target data; and a selecting unit selecting at least one second processing target data from among said plural second processing target data on the basis of the first additional information, the second additional information, and a selection condition that has been set in advance.

In the meantime, the selecting unit may comprise a first selecting unit selecting two or more second processing target data satisfying the selection condition from among said plural second processing target data with reference to the selection condition on the basis of the first additional information; and a second selecting unit selecting one second processing target data from among said two or more second processing target data that are selected by the first selecting unit. In addition, the data processing apparatus according to the present invention may comprise a selection condition setting unit capable of setting the selection condition.

In addition, the second selecting unit may select the one second processing target data from among said two or more second processing target data on the basis of a processing history of the second processing target data. In addition, the second selecting unit may select the one second processing target data from among said plural second processing target data by using a random number.

In addition, the first additional information may be the date and time information with regard to the first processing target data and the second additional information is the date and time information with regard to the second processing target data; and the selection condition may have a specific relation between the first additional information and the second additional information with regard to at least any one of a date and time, a month, and a season.

Further, the second processing target data may be music data, and the first processing target data may be image data.

In addition, the additional information may be the information with regard to a recording date and time of the music data, a release date and time of the music data, a purchase date and time of the music data, a saving date and time of the music data, and a reproduction history of the music data.

Further, the additional information may be the information with regard to a shooting date and time of the image data, a creating date and time of the image data, an acquisition date and time of the image data, and a saving date and time of the image data.

In addition, the first additional information may be local information with regard to the first processing target data and the second additional information may be the local information with regard to the second processing target data; and the selection condition has a specific relation between the first additional information and the second additional information with regard to a locality.

Further, the second processing target data may be the music data and the additional information may be the information with regard to at least any one of a recording area, a release area, a purchase area, a saving area, and a reproduction area of the music data.

In addition, the first processing target data may be the image data and the additional information may be the information with regard to any one of a shooting area, a creating area, an acquisition area, and a saving area of the image data.

Further, an information system according to the present invention may comprise an additional information acquisition unit acquiring first additional information with regard to first processing target data; a second processing target data storage unit storing a plurality of second processing target data that are processed in relation to the first processing target data; a second additional information acquisition unit acquiring second additional information with regard to the second processing target data; a selection condition storage unit storing a selection condition to select at least one second processing target data from among said plurality of second processing target data that are stored in the second processing target data storage unit; and a selecting unit for selecting at least one second processing target data from among said plurality of second processing target data on the basis of the first additional information, the second additional information, and a selection condition that has been set in advance.

In addition, a selection program according to the present invention causing a computer to execute a selection function selecting at least one second processing target data from among a plurality of second processing target data that are processed in relation to a first processing target data; the selection program causes the computer to function as a first additional information acquisition unit for acquiring the first additional information with regard to the first processing target data, a second additional information acquisition unit for acquiring the second additional information with regard to the second processing target data, and a selecting unit for selecting at least any one of the second processing target data from among said plurality of second processing target data on the basis of the first additional information, the second additional information, and the selection condition that has been set in advance.

Then, a computer-readable recording medium according to the present invention may record the above-described selection program.

As described above in detail, according to the present invention, the following effect and advantage can be acquired.

(1) It is possible to select the second processing target data that is the most suitable for the first processing target data from among a plurality of second processing target data processed in relation to the first processing target data. Therefore, the present invention is very convenient and excellent in the aspect of a pastime.

(2) The present invention can set the selection condition and is very convenient.

(3) The present invention can easily select the second additional information having a specific relation to at least any one of a date and time, a month, and a season with respect to the first additional information.

(4) The present invention can easily select the second processing target data having a specific relation to a locality with respect to the first processing target data.

BRIEF DESCRIPTION OF THE DRAWINGS

FIGS. 2(A), 2(B), 2(C), and 2(D) are views explaining the information to be stored in a memory unit of the selection system according to the embodiment of the present invention.

FIG. 3 illustrates an example of a music selection rule setting screen in the selection system according to the embodiment of the present invention.

DESCRIPTION OF THE PREFERRED EMBODIMENTS

An embodiment of the present invention will be described below with reference to the drawings.

Figure 1:
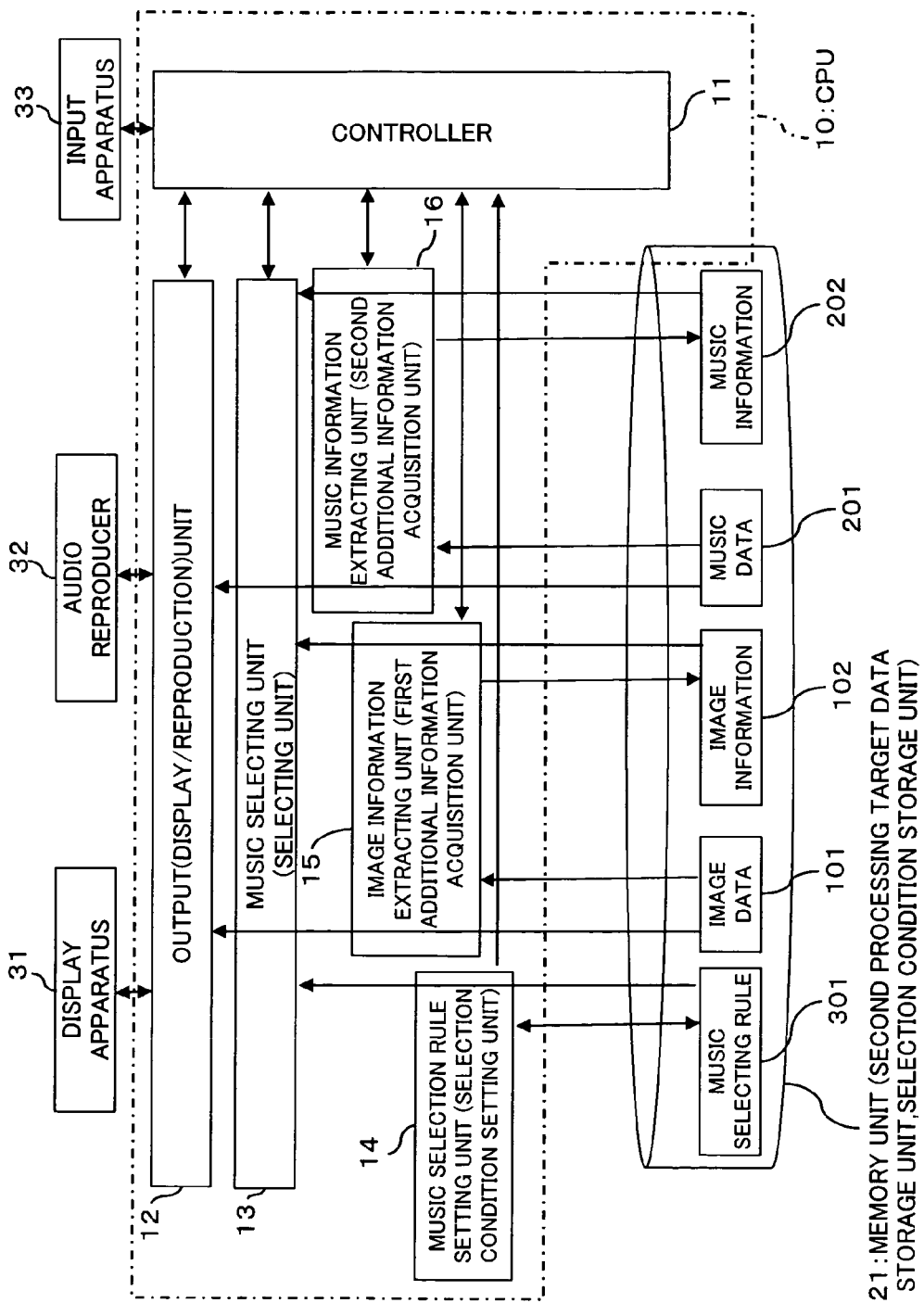
FIG. 1 is a block diagram showing a structure of a selection system according to an embodiment of the present invention.

FIG. 1 is a block diagram showing a structure of a selection system according to an embodiment of the present invention. The present selection system (an information processing system, a data processing apparatus) 1 is realized by a general personal computer or the like having a display unit 31, an audio reproducer 32, an input apparatus 33, a CPU (Central Processing Unit) 10, and a memory unit 21.

In this case, functions as a controller 11, an output unit 12, a music selecting unit (selecting unit) 13, a music selection rule setting unit (selection condition setting unit) 14, an image information extracting unit (a first additional information acquisition unit) 15, and a music information extracting unit (a second additional information acquisition unit) 16 are realized by executing a predetermined program (a selection program) by the CPU 10.

According to this personal computer (the selection system 1), a slide show function to display a plurality of image data (the first processing target data) on the display unit 31 while sequentially changing over them is provided, and further, reproduction of music (music data) may be possible as the BGM (Background Music) during execution of this slide show function.

Thus, the present selection system 1 may automatically select the music data that is reproduced upon display of the image data.

The display unit 31 may display various information such as the image data of a still image and a moving image or the like and the text information or the like, and for example, the display unit 31 is constructed by a LCD (liquid crystal display) and a CRT (cathode-ray tube) display or the like to be controlled by the output unit 12 to be described later.

The audio reproducer 32 may output various sounds by reproducing the music data. For example, the audio reproducer 32 is constructed by a speaker unit to be controlled by the output unit 12. An operator may input various information with the input unit 33 and it is constructed by a mouse and a keyboard or the like. In the meantime, according to the present embodiment, it is assumed that music data 201 includes the voice data, and further, the music data 201 includes the data with regard to various sounds other than the music and the voice.

The memory unit 21 may store various information, and for example, it is constructed by a hard disk and a memory. In the present selection system 1, the memory unit 21 may store image data 101, image information 102, music data 201, music information 202, and a music selecting rule (music selection condition) 301 therein.

FIGS. 2(A), 2(B), 2(C), and 2(D) are views for describing the information stored in the memory unit 21 of the selection system 1 as the embodiment of the present invention. Specifically, FIG. 2(A) illustrates an example of an image data group, FIG. 2(B) illustrates an example of a music data group, FIG. 2(C) illustrates an example of items using the image data, and FIG. 2(D) illustrates an example of items using the music data.

As shown in FIG. 2(A), the memory unit 21 may store an image data group 100 composed of a plurality (according to the example shown in FIG. 2(A), eight pieces) of image data 101a, 101b, 101c, 101d, 101e, 101f, 101g, and 101h therein. In the meantime, as a reference mark representing the image data, when it is necessary to specify one from among the plural image data, reference marks 101a to 101h are used, however, when representing arbitrary image data, a reference mark 101 is used.

The image data 101 is formed in accordance with a standard such as an Exif (Exchangeable Image File Format) or the like, and the image data 101 may record the additional information (the image information, the first additional information) with regard to the image together with the image. In the meantime, as the additional information of this image data 101, various information can be recorded, and according to the example shown in FIG. 2(A), a shooting date and time, a creating date and time, and an acquisition date and time are recorded as the additional information.

In this case, the shooting date and time is a date and time when the image is filmed, and this is used in the case that the image is filmed by a camera or the like. The creating date and time is a date and time when the image is created, and this is used when the image is created and processed by image processing software or the like. The acquisition date and time is a date and time when the image is acquired, and this is used when the image is acquired, for example, by means of downloading through the Internet and the image is received by communication means such as an Electric mail or the like.

In addition, as the image information for the image data 101, in addition to the above-described various information, the user (the operator or the like) can add and edit the arbitrary information.

Further, as shown in FIG. 2(B), the memory unit 21 may store a music data group 200 composed of a plurality (in the example shown in FIG. 2(B), five pieces) of music data 201a, 201b, 201c, 201d, and 201e therein. In the meantime, hereinafter, as a reference mark representing the music data, when it is necessary to specify one from among the plural music data, reference marks 201a to 201e are used, however, when representing arbitrary music data, a reference mark 201 is used.

The music data 201 is formed in accordance with a standard such as an MP3 (MPEG Audio Layer-3) or the like, and the music data 201 may record the additional information with regard to the music together with the music. In the meantime, as the additional information added to this music data 201, various information can be recorded, and according to the example shown in FIG. 2(B), a release date and time and an acquisition date and time are recorded as the additional information.

In this case, the release date and time is a date and time when the music is released or sold. The acquisition date and time is a date and time when the music is acquired, and this is used when the image is acquired, for example, by means of downloading through the Internet.

For example, when the music data is created in a standard of MP3, the additional information can be added to it as the information of an ID tag such as ID3v1 and ID3v2 or the like.

In addition, as the music information with respect to the music data 201, the user (the operator) can also add and edit the arbitrary information in addition to the above-described various information.

Further, with respect to each of the additional information related to the above-described image data 101, it is possible to arbitrarily decide whether the additional information is used or not upon selection of the music data 201. FIG. 2(C) is a view (an image data time item) of a setting example showing whether each of additional information with respect to the image data 101 is used or not used. According to the example shown in this FIG. 2(C), it is set that the shooting date and time is only used and the creating date and time and the acquisition date and time are not used.

Then, the music selecting unit 13 to be described later may select the music data 201 with reference to the image data time item shown in this FIG. 2(C) and the item in which "USED" is set (in the example shown in FIG. 2(C), the shooting date and time).

In the same way, it is also possible to arbitrarily decide whether the additional information is used or not upon selection of the music data 201 with respect to each of the additional information related to the music data 201. FIG. 2(D) is a view (a music data time item) of a setting example showing whether each of additional information with respect to the music data 201 is used or not used. According to the example shown in this FIG. 2(D), it is set that the acquisition date and time is only used and the release date and time is not used.

Then, the music selecting unit 13 to be described later may select the music data 201 with reference to the music data time item shown in this FIG. 2(D) and the item in which "USED" is set (in the example shown in FIG. 2(D), the acquisition date and time). In the meantime, with respect to each of the above-described additional information, the setting information of USED and NOT USED (the image data time item, the music data time item) is also stored in the memory unit 21 as a part of the music selecting rule 301, and the music selecting unit 13 may refer to these information upon selection of the music data 201.

The image information extracting unit (the first additional information acquisition unit) 15 may acquire (extract) the additional information (the shooting date and time, the creating date and time, the acquisition date and time) from the image data 101 stored in the memory unit 21, and the extracted additional information is stored in the memory unit 21 in response to each image data 101 as the image information 102. Then, the music selecting unit 13 can refer to the image information 102 stored in this memory unit 21.

The music information extracting unit (a second additional information acquisition unit) 16 may acquire (extract) the additional information (the release date and time, the acquisition date and time) from the music data 201 stored in the memory unit 21, and the extracted additional information is stored in the memory unit 21 in response to each music data 201 as the music information 202. Then, the music selecting unit 13 can refer to the music information 202 stored in this memory unit 21.

The music selection rule setting unit (selection condition setting unit, selection condition changing unit) 14 may set the music selecting rule (the selection condition) 301 or may change the selection condition that has been created in advance, and by the music selection rule setting unit 14, the user can set or change the rule to combine the image with the music, namely, the selection condition for selecting the music to be reproduced together with display of the image from among the plural music data.

FIG. 3 illustrates an example of a music selection rule setting screen 311 in the selection system 1 according to the embodiment of the present invention, and the music selection rule setting unit 14 may display the music selection rule setting screen 311 as shown in this FIG. 3 on the display unit 31 to make the user input (select) various information for setting the music selecting rule 301. Then, the music selection rule setting unit 14 may set the music selecting rule 301 in accordance with the input (setting) that is carried out by the user on this music selection rule setting screen 311.

For example, according to the present embodiment, with respect to each of image and music, it is possible to set a priority of the date and time information to be used. Specifically, with respect to the image, a priority can be set about four items (date and time), namely, the shooting date and time, the creating date and time, the acquisition date and time, and the filing date and time when using them in order to select the music, and with respect to the music, a priority can be set about four items (date and time), namely, the recording date and time, the purchase date and time, the release date and time, and the filing date and time when using them in order to select the music.

According to the example shown in this FIG. 3, with respect to the image, the date information is set to be preferentially used in the order of the shooting date and time, the creating date and time, the acquisition date and time, and the filing date and time, and with respect to the music, the date information is set to be preferentially used in the order of the recording date and time, the purchase date and time, the release date and time, and the filing date and time.

In the meantime, the filing date and time is a date and time when the image data 101 and the music data 201 are saved (filed) in the memory unit 21 and for example, the filing date and time is included in the filing information to be created and managed by an OS (Operating System). In the meantime, in the examples of the image data 101 and the music data 201 shown in FIG. 2, this filing date and time is not shown, however, the image data 101 and the music data 201 may include this filing date and time.

The operator selects the item of which priority is set or changed by using a mouse and a keyboard (an arrow key, a selection key, and a menu key or the like) so that these rank orders of the priority are set.

In addition, according to the present embodiment, it is also possible to set the priority used for selecting the music with respect to the music selecting rule (the music selection condition) 301 on three conditions of "combination of the same months", "combination of the same seasons", and "combination of the close date and time" as the priority rank. In the meantime, according to the example shown in FIG. 3, the music selection condition is set to be preferentially applied in the order of "combination of the same months", "combination of the same seasons", and "combination of the close date and time".

Further, according to the present embodiment, the seasons (four seasons) are set assuming that March to May are spring, June to August are summer, September to November are autumn, and December to February are winter, and on the basis of these settings, "the same season" is determined. In the meantime, correspondence between these months and the seasons is not limited to this and various modifications are made in response to a local difference.

In addition, according to the present embodiment, as shown in FIG. 3, in the range of the music selection, it is possible to select the music data 201 that is the most suitable for the above-described music selection condition (refer to "always select the most suitable one for the music selection condition" shown in FIG. 3) upon selection of the music and to select two or more music data 201 by selecting it in a wide range of the music selection condition (refer to "select in a wide range of a music selection condition" shown in FIG. 3).

The music selecting unit (the selecting unit, the first selecting unit, the second selecting unit) 13 may select at least one of the music data 201 that is suitable for the music selecting rule 301 on the basis of the image information 102 extracted by the image information extracting unit 15, the music information 202 extracted by the music information extracting unit 16, and the music selecting rule 301 set by the music selection rule setting unit 14.

Specifically, the music selecting unit (the first selecting unit) 13 may select two or more music data 201 satisfying the music selection rule from among a plurality of music data 201 by referring to the music selecting rule 301 on the basis of the image information 102 (the first selecting unit), and further, the music selecting unit 13 may select one music data 201 from among two or more music data 201 (the second selecting unit).

Then, the music selecting unit (the second selecting unit) 13 may select one music data 201 from among two or more music data 201 by using, for example, a random number, and the random selection of the music data 201 makes the selection system excellent in the aspect of a pastime.

In addition, the music selecting unit (the second selecting unit) 13 may select one music data 201 from among two or more music data 201 on the basis of a processing history of these music data 201. For example, the music selecting unit (the second selecting unit) 13 may select the music data 201 that was reproduced most in the past, or may select the music data 201 that was reproduced least on the contrary, or may select the music data 201 that was reproduced last, or may select the music data 201 that has not been reproduced for the longest time.

In the case that there is a plurality of image data 101 of a display target in the present selection system 1 and there is a difference in the image information such as a different shooting date and time and a different acquisition date and time or the like in these plural image data 101, the controller 11 selects and extracts the representative data from among these image data 101 and the music selecting unit 13 carries out selection with reference to the music selecting rule 301 by using the image information of this representative data.

As the representative data, for example, the image data 101 with the oldest date and time information in the image data group 100, the image data 101 with the latest date and time information in the image data group 100 or the image data 101 that is selected at random may be used.

In addition, in place of selection and extraction of the representative data, by calculating an average value of the image information with respect to a plurality of image data 101, the selection processing may be carried out with reference to the selection rule 301 using the image information of this average value or the selection processing may be carried out with reference to the selection rule 301 using the image information of the most frequent value. Thus, various modifications will be possible without departing from the scope of the present invention.

The output (display/reproduce) unit 12 controls the display unit 31 and the audio reproducer 32 so as to display the image data 101 on the display unit 31 and reproduce the music data 201 on the audio reproducer 32. According to the present embodiment, when the music data 201 is selected by the music selecting unit 13, the output unit 12 may display this selected music data 201 on the audio reproducer 32.

The controller 11 may control the output unit 12, the music selecting unit 13, the music selection rule setting unit 14, the image information extracting unit 15, and the music information extracting unit 16. In other words, the controller 11 may control various functions in the present selection system 1 on the basis of various input operations or the like that are carried out by the operator from the input apparatus 33.

In the selection system 1 as an embodiment of the present invention that is constructed as described above, at first, the image data 101 and the music data 201 are registered. In other words, with respect to the mage data 101 to be displayed on the display unit 31, the image information extracting unit 15 may extract the additional information such as the shooting date and time, the creating date and time, the acquisition date and time, and the filing date and time on the basis of the mage data 101 to store the extracted additional information in the memory unit 21 as the image information 102. In addition, the music information extracting unit 16 may extract the additional information such as the release date and time, the acquisition date and time, and the filing date and time or the like of the music of the music data 201 that can be reproduced from the audio reproducer 32 on the basis of the music data 201 to store the extracted additional information in the memory unit 21 as the music information 202.

In addition, the operator may set the music selection rule by carrying out various inputs and selections on the music selection rule setting screen that is displayed on the display unit 31 by the music selection rule setting unit 14.

In the meantime, these extraction and storing processing of the image information 102 and the music information 202 and the setting processing of the music selection rule may be carried out in advance or these processing may be carried out on an as-needed basis when selecting the music data 201.

Figure 4:
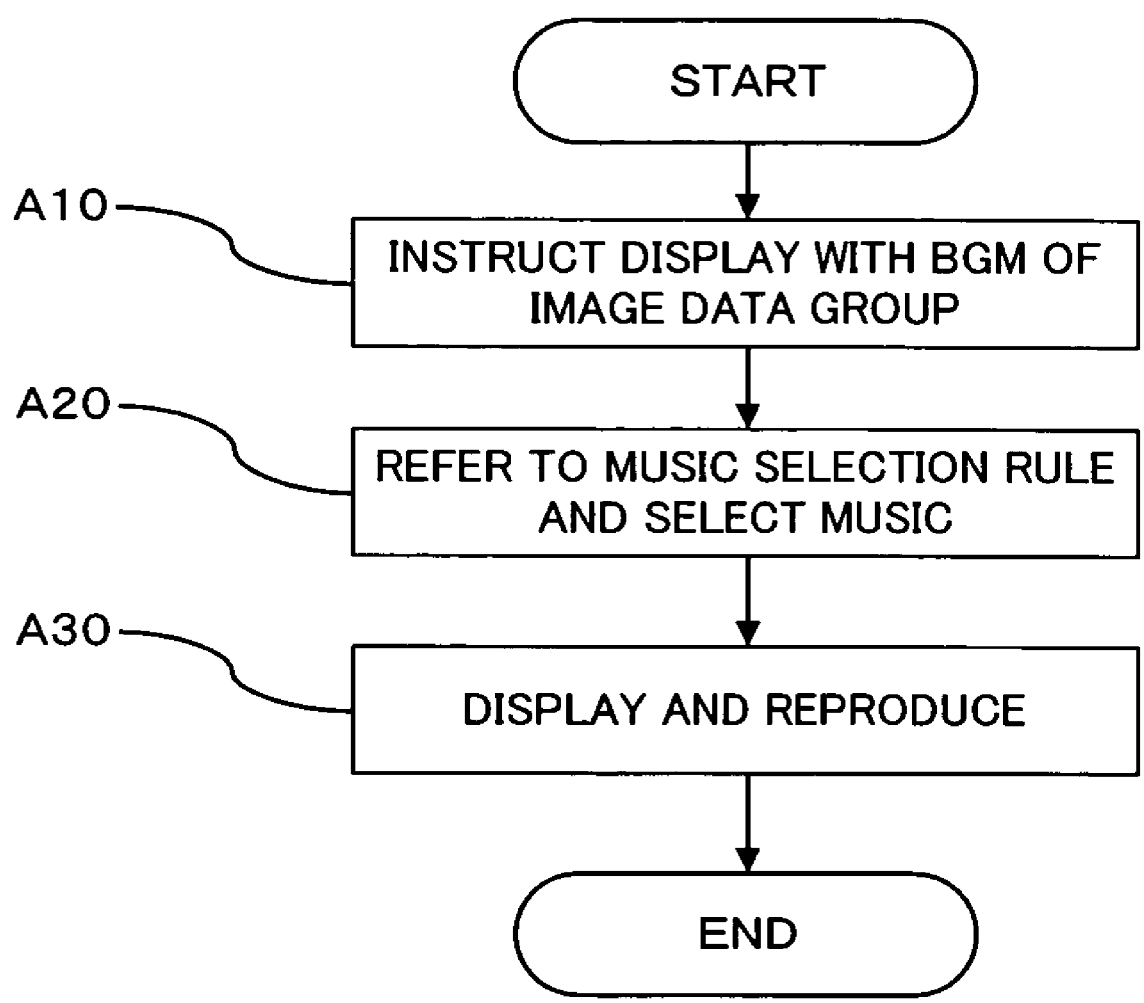
FIG. 4 is a flow chart for explaining selection processing of music data in the selection system according to the embodiment of the present invention.

In the next place, the selecting processing of the music data 201 in the selection system 1 according to the embodiment of the present invention will be described below in accordance with a flow chart (steps A10 to A30) shown in FIG. 4.

When the operator instructs to display the image data 101 (the image data group 100) with the reproduction of the BGM via the input apparatus 33 (step A10), the music selecting unit 13 may compare the image information 102 with the music information 202 and evaluate them with reference to the music selection rule 301 stored in the memory unit 21 and in accordance with this music selection rule 301, and then, the music selecting unit 13 may select the music data 201 suitable for the image data 101 of the display target (step A20).

In the meantime, when selecting the music data in a wide range of the music selection condition, namely, when using the music selection rule of the combination of the latest date and time, a plurality of music data 201 is selected, and then, the music selecting unit 13 may select one music data 201 from these plural music data 201 on the basis of the random number and the reproduction history.

The output unit 12 may sequentially display the image data 101 on the display unit 31 and may reproduce the selected music data 201 on the audio reproducer 32 (step A30).

In this way, in the selection system 1 as the embodiment of the present invention, by comparing the image information (the time information) such as the shooting date and time, the creating date and time, and the acquisition date and time of a plurality of image data 101 with the music information (the time information) such as the release date and time, the purchase date and time, the acquisition date and time, the date when downloaded into the machine, and the reproduction history or the like of the music data 201 that can be reproduced as the BGM, it is possible to select the optimum music data 201 on the basis of these information and the music selection rule 301.

For example, when displaying the image data 101 filmed in October on the display unit 31, it is possible to reproduce the music that is seemingly most suitable for the image by automatically selecting and reproducing the music released in the same month, namely, October, the music released in the same season (namely, autumn), and the music data 201 released at the close date and time, so that the present selection system 1 is very convenient and excellent in the aspect of a pastime. In the present selection system 1, the music data 201 having a relation to the image data 101 is selected by the music selecting unit 13, so that the present selection system 1 is excellent in the aspect of a pastime for the operator.

In addition, it is possible to automatically select the music data 201 from among a plurality of music data 201 (the music data group 200), so that there is no need for the operator to perform the complicated selection operation and it is very convenient for the operator.

In this case, the music selecting unit 13 automatically selects the music data to be reproduced from among the music data 201 stored in the memory unit 21 on the basis of the image information 102, the music information 202, and the music selection rule 301, and the music information extracting unit 16 extracts the additional information of the music data 201 of this music and stores it in the memory unit 21 as the music information 202, for example, when the user acquires new music, so that the target of music selection as the BGM is automatically acquired and it is very convenient.

Further, when selecting the music in a wide range of the music selection condition, namely, when the music selection condition of "the combination of the close date and time" is used, the music selecting unit 13 selects one music data 201 by using the random number from among a plurality of music data 201 that has been previously selected. Thereby, even if the same image data group 100 is displayed many times, the same music is not always selected. Therefore, the selection system is excellent in the aspect of a pastime.

In other words, the present selection system 1 is excellent in the aspect of a pastime and enhances an operationality of a computer and an AV (Audio and Visual) home electric appliance, the selection system can contribute to increasing the number of the users and, further, widespread of the computers and the home electric appliances.

In addition, with respect to the image data 101, it is possible to easily select the music data 201 having a specific relation to at least any one of the date and time, the month, and the season.

In the meantime, a program (a selection program) for realizing the functions as the music selecting unit (selecting unit) 13, the music selection rule setting unit 14, the image information extracting unit (the first additional information acquisition unit) 15, and the music information extracting unit (the second additional information acquisition unit) 16 is provided as recorded in a computer-readable recording medium, for example, a flexible disk, a CD (CD-ROM, CD-R, CR-RW or the like), a DVD (DVD-ROM, DVD-RAM, DVD-R, DVD-R, DVD-RW, DVD+RW or the like), a magnetic disk, an optical disk, and an optical magnetic disk or the like. Then, by reading the program from the recording medium, the computer transfers it to an inner memory unit or an outer memory unit and stores therein. Alternatively, after recording the program, for example, in the memory unit (the recording medium) such as the magnetic disk, the optical disk, and the optical magnetic disk or the like, the program may be provided to the computer from the memory unit through a communication path.

In order to realize the functions as the music selecting unit (selecting unit) 13, the music selection rule setting unit 14, the image information extracting unit (the first additional information acquisition unit) 15, and the music information extracting unit (the second additional information acquisition unit) 16, the program stored in the inner memory unit (the RAM and the ROM or the like) is executed by a micro processor of the computer (a CPU of a personal computer according to the present embodiment). In this case, the computer may read the program recorded in the recording medium and execute it.

In the meantime, according to the present embodiment, a computer is a concept including hardware and an operating system, and the computer means hardware that is operated under control of the operating system. In addition, in the case of operating the hardware only by an application program without the operating system, this hardware itself corresponds to the computer. The hardware is at least provided with a micro processor such as a CPU or the like and means for reading a computer program that is recorded in the recording medium. According to the present embodiment, the selection system 1 has a function as the computer.

Further, as the recording medium according to the present embodiment, various computer-readable mediums such as an IC card, a ROM cartridge, a magnetic tape, a punch card, an inner memory unit of a computer (a memory such as the RAM and the ROM or the like), an outer memory unit, and a printed material with a code such as a bar code or the like printed thereon can be used as well as the above-described flexible disk, the CD, the DVD, the magnetic disk, the optical disk, and the optical magnetic disk or the like.

In addition, the present selection system 1 can be also applied for selecting the music data 201 to be reproduced as the BGM when creating, for example, the above-described slide show, so that it is possible to enhance the operationality in an AV editing and creating apparatus.

Then, the present invention is not limited to the above-described embodiment and various modifications will be possible without departing from the scope of the present invention.

For example, the additional information with regard to the image data 101 is not limited to the above-described shooting date and time, creating date and time, and acquisition date and time and for example, a date and time when the data is used (browsed) last (the last used date and time) may be used and various modifications will be possible without departing from the scope of the present invention. Further, the additional information is not limited to the above-described date and time information, and for example, the additional information may be the information showing a person who shot (created, acquired) the image or a place (the local information) where the image is shot (created, acquired).

Then, as such local information, for example, positional information acquired by using a GPS (global positioning system) function can be used. In recent years, for example, an information processing apparatus provided with a GPS function and a digital camera such as a cellular phone, a PDA (Personal Digital Assistants), and a laptop or the like has been known, and by using such a device, it is possible to easily add the local information as the additional information to the image data.

Thereby, it is possible to easily select the music data 201 having a specific relation to the locality with respect to the image data 101.

In addition, the additional information with regard to the music data 201 is not limited to the above-described release date and time and acquisition date and time and various modifications will be possible without departing from the scope of the present invention. For example, a date and time when the data is used (reproduced) last (the last used date and time) and the number of reproduction may be used. Thereby, it is possible to preferentially select the music that the operator frequently and preferably reproduced.

In addition, the additional information is not limited to the above-described date and time information, for example, the information showing a person (an artist) who created the music (wrote lyrics, composed the music) and a person who acquires the music, the information with regard to a player, the information showing a place (local information) where the music is released, created, recorded, and acquired, and a name of an album and genre may be available.

Further, the image data 101 is not limited to the data created in accordance with a standard of the Exif, and in the same way, the music data 201 is not limited to the data created in accordance with a standard of the MP3. As these image data 101 and music data 201, the data created in accordance with various standards can be used.

In addition, it is not necessary that the additional information is provided to the image data 101 and the music data 201 and the additional information may be acquired from the outside of the image data 101 and the music data 201. For example, the database may be created by relating the additional information to each of the image data 101 and the music data 201 and the image information extracting unit 15 and the music information extracting unit 16 may acquire each additional information from this database. Such a database may be created by the user and a database service for commercial use or non-commercial use that has been laid open on the Internet as a CDDB (Compact Disc Data Base) service or the similar service may be used.

In the meantime, according to the above-described embodiment, the music data 201 to be reproduced when displaying the image data 101 is selected, however, the present invention is not limited to this and in the case of creating the data that is composed by combining the image data 101 with the music data 201, the music data 201 can be selected to be combined with the image data 101.

In addition, according to the above-described embodiment, the memory unit 21 stores the music selection rule 301, the image data 101, the image information 102, the music data 201, and the music information 202 therein, however, the present invention is not limited to this, and at least a part of these music selection rule 301, the image data 101, the image information 102, the music data 201, and the music information 202 may be stored in other memory unit, and further, these memory units may be provided on other computer that is connected therewith via the communication circuit such as a LAN (Local Area Network) or the like.

The present selection system 1 can be applied to, for example, AV viewing software for a personal computer and editing and creating software. In addition, the present selection system 1 can be applied to AV home electric appliance firmware and software, automatic creation of the BGM at a terminal of a kiosk, and automatic creation of the BGM in a professional-use system for advertisement or the like other than the above.

Further, the present selection system 1 is not limited to selection of the music data 201 to be reproduced upon display of the image data 101 but the present selection system 1 can be used to select various data (the second processing target data) to be processed in relation to the specific data (the first processing target data). For example, according to a personal computer, in the case of combining the text data (the first processing target data) created by a word processor with the data of spreadsheet software (the second processing target data) and the image data (the second processing target data) or the like, the present selection system 1 can be applied to select the data of the spreadsheet software and the image data.

In the meantime, if the embodiment of the present invention is disclosed, it is possible to implement and produce the present invention by a person skilled in the art.

Other than selection of the music data to be reproduced when displaying the image data, the present invention can be applied to a case in which various data to be processed in relation to the specific data are selected, for example, in a case of selecting data when combining the text data created by the word processor with the data of the spreadsheet software and the image data or the like in a personal computer.

What is claimed is:

1. A data processing apparatus, comprising:
   a first additional information acquisition unit acquiring first additional information with regard to first processing target data,
   a second additional information acquisition unit acquiring second additional information with regard to second processing target data that is processed in relation to the first processing target data
   a selecting unit selecting at least one second processing target data from among said plural second processing target data on the basis of the first additional information, the second additional information, and a selection condition that has been set in advance,
   wherein said selecting unit includes
      a first selecting unit selecting two or more second processing target data satisfying the selection condition from among said plural second processing target data with reference to the selection condition on the basis of the first additional information, and
      a second selecting unit selecting one second processing target data from among said two or more second processing target data that are selected by the first selecting unit on the basis of a processing history of the second processing target data.

2. The data processing apparatus according to claim 1, wherein the second selecting unit selects said one second processing target data from among said plural second processing target data by using a random number.

3. The data processing apparatus according to claim 1, comprising a selection condition setting unit capable of setting the selection condition.

4. The data processing apparatus according to claim 1, wherein the first additional information is date and time information with regard to the first processing target data and the second additional information is the date and time information with regard to the second processing target data; and
   the selection condition has a specific relation between the first additional information and the second additional information with regard to at least any one of a date and time, a month, and a season.

5. The data processing apparatus according to claim 1, wherein the second processing target data is music data.

6. The data processing apparatus according to claim 5, wherein the second additional information is information with regard to a recording date and time of the music data.

7. The data processing apparatus according to claim 6, wherein the second additional information is the information with regard to the release date and time of the music data.

8. The data processing apparatus according to claim 5, wherein the second additional information is the information with regard to a release date and time of the music data.

9. The data processing apparatus according to claim 5, wherein the second additional information is the information with regard to a purchase date and time of the music data.

10. The data processing apparatus according to claim 5, wherein the second additional information is the information with regard to a saving date and time of the music data.

11. The data processing apparatus according to claim 5, wherein the second additional information is the information with regard to a reproduction history of the music data.

12. The data processing apparatus according to claim 1, wherein the first processing target data is image data.

13. The data processing apparatus according to claim 12, wherein the first additional information is the information with regard to a shooting date and time of the image data.

14. The data processing apparatus according to claim 13, wherein the first additional information is the information with regard to the creating date and time of the image data.

15. The data processing apparatus according to claim 12, wherein the first additional information is the information with regard to a creating date and time of the image data.

16. The data processing apparatus according to claim 12, wherein the first additional information is the information with regard to an acquisition date and time of the image data.

17. The data processing apparatus according to claim 12, wherein the first additional information is information with regard to a saving date and time of the image data.

18. The data processing apparatus according to claim 1, wherein the first additional information is local information with regard to the first processing target data and the second additional information is the local information with regard to the second processing target data; and
   the selection condition has a specific relation between the first additional information and the second additional information with regard to a locality.

19. The data processing apparatus according to claim 18, wherein the second processing target data is the music data and the second additional information is the information with regard to at least any one of a recording area, a release area, a purchase area, a saving area, and a reproduction area of the music data.

20. The data processing apparatus according to claim 19, wherein the first processing target data is the image data and the first additional information is the information with regard to any one of the shooting area, the creating area, the acquisition area, and the saving area of the image data.

21. The data processing apparatus according to claim 18, wherein the first processing target data is the image data and the first additional information is the information with regard to any one of a shooting area, a creating area, an acquisition area, and a saving area of the image data.

22. An information system comprising:
   a first additional information acquisition unit acquiring first additional information with regard to first processing target data;
   a second processing target data storage unit storing a plurality of second processing target data that are processed in relation to the first processing target data;

a second additional information acquisition unit acquiring second additional information with regard to the second processing target data;

a selection condition storage unit storing a selection condition to select at least one second processing target data from among said plurality of second processing target data that are stored in the second processing target data storage unit; and a selecting unit selecting at least one second processing target data from among said plurality of second processing target data on the basis of the first additional information, the second additional information, and a selection condition that has been set in advance, wherein said selecting unit includes a first selecting unit selecting two or more second processing target data satisfying the selection condition from among said plural second processing target data with reference to the selection condition on the basis of the first additional information, and a second selecting unit selecting one second processing target data from among said two or more second processing target data that are selected by the first selecting unit on the basis of a processing history of the second processing target data.

23. A computer-readable recording medium recording a selection program for causing a computer to execute a selection function of selecting at least one second processing target data from among a plurality of second processing target data that are processed in relation to first processing target data;

wherein the selection program causes the computer to function as a first additional information acquisition unit acquiring first additional information with regard to the first processing target data, a second additional information acquisition unit acquiring second additional information with regard to the second processing target data, and a selecting unit selecting at least any one of the second processing target data from among said plurality of second processing target data on the basis of the first additional information, the second additional information, and a selection condition that has been set in advance;

wherein said selecting unit includes a first selecting unit selecting two or more second processing target data satisfying the selection condition from among said plural second processing target data with reference to the selection condition on the basis of the first additional information, and a second selecting unit selecting one second processing target data from among said two or more second processing target data that are selected by the first selecting unit on the basis of a processing history of the second processing target data.

* * * * *